(12) United States Patent
Tsutsui (10) Patent No.: US 6,674,472 B1
(45) Date of Patent: Jan. 6, 2004

(54) DIGITAL CAMERA AND METHOD WHICH DISPLAYS A PAGE NUMBER OF A DISPLAYED PAGE

(75) Inventor: Satoru Tsutsui, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/210,709

(22) Filed: Dec. 14, 1998

(30) Foreign Application Priority Data

Dec. 24, 1997 (JP) ............................................. 9-354801

(51) Int. Cl.⁷ ........................... H04N 5/222; G06F 7/00; G09G 5/00
(52) U.S. Cl. ............................ 348/333.05; 348/333.01; 348/231.99; 348/231.2; 707/104.1; 345/835; 345/838
(58) Field of Search ....................... 348/231.99, 333.01, 348/333.05; 707/104.1; 345/838, 835; 715/503

(56) References Cited

U.S. PATENT DOCUMENTS

| | | | | |
|---|---|---|---|---|
| 4,802,019 A | * | 1/1989 | Harada et al. ............... | 345/168 |
| 5,164,831 A | | 11/1992 | Kuchta et al. | |
| 5,383,029 A | | 1/1995 | Kojima | |
| 5,742,339 A | * | 4/1998 | Wakui ...................... | 369/275.1 |
| 6,020,920 A | * | 2/2000 | Anderson ................. | 348/220.1 |
| 6,097,431 A | * | 8/2000 | Anderson et al. ........... | 345/841 |
| 6,122,003 A | * | 9/2000 | Anderson ............... | 348/207.99 |
| 6,226,449 B1 | * | 5/2001 | Inoue et al. ............. | 348/231.4 |
| 6,233,015 B1 | * | 5/2001 | Miller et al. ............. | 348/222.1 |
| 6,301,586 B1 | * | 10/2001 | Yang et al. ............... | 707/104.1 |

FOREIGN PATENT DOCUMENTS

| | | |
|---|---|---|
| EP | 0 356 351 | 2/1990 |
| EP | 0 698 993 | 2/1996 |
| JP | 8-195927 | 7/1986 |

* cited by examiner

*Primary Examiner*—Andrew Christensen
*Assistant Examiner*—Brian Genco
(74) *Attorney, Agent, or Firm*—Oblon, Spivak, McClelland, Maier & Neustadt, P.C.

(57) ABSTRACT

A digital camera includes a memory configured to store image data including thumbnail image data and a display configured to display the thumbnail image data. Further, a controller is configured to control the display of the thumbnail image data and to display page data with the thumbnail image data. The page data can include data of a currently displayed page and data of a total number of pages, and further an operator can set and reset the number of thumbnail images which form one page. Further, the operator can change this setting of the number of thumbnail images in one page while selecting a specific thumbnail image of a currently displayed page of thumbnail image data. The controller can calculate the total number of pages in a currently displayed page, and can recalculate this data if the number of thumbnail images in a page is reset by an operator. Further, each of the pages can be accessed sequentially and the first and last pages can be viewed as sequential pages. Segment data can also be displayed and can be recalculated if a number of thumbnail images which form one page is reset by an operator.

18 Claims, 9 Drawing Sheets

| FILE NAME OF RECORDED DATA | ATTRIBUTE OF THE FILE | RESERVED AREA | CREATION/ UPDATE TIME | CREATION/ UPDATE DATE | FAT STARTING NUMBER | FILE SIZE |
|---|---|---|---|---|---|---|
| RIM00001.JPG | | | | | | |
| RIM00002.JPG | | | | | | |
| RIM00003.JPG | | | | | | |
| RIM00004.JPG | | | | | | |
| ⋮ | | | | | | |

TOTAL PAGE NUMBER
CURRENTLY DISPLAYED PAGE NUMBER

PAGE MOVING BACK    PAGE FORWARDING

A TOTAL PAGE NUMBER
CURRENTLY DISPLAYED PAGE NUMBER

DIGITAL CAMERA AND METHOD WHICH DISPLAYS A PAGE NUMBER OF A DISPLAYED PAGE

BACKGROUND OF THE INVENTION

1. Field of the Invention

This invention relates to a digital camera which can display a plurality of thumbnail images in a display area of the camera, and more particularly to a digital camera and method which displays page and/or segment information of a currently displayed page.

2. Discussion of the Background

Recently, a digital camera having a function to display thumbnail images in a display area of the camera has become popular and, for example, a digital camera having such a function is described in Japanese Laid-Open Patent Publication No. 8-195927. The term "thumbnail images" refers to a reduced data image of a conventional image. More specifically, in a digital camera full image data of an image can be stored, and a thumbnail image which presents a fraction of the data of the full image data can also be stored. An operator can then quickly review the thumbnail image data prior to selecting a full image data.

In the digital camera described in JP No. 8-195927, an optical image of an object is formed on an imaging device by a lens to be photoelectrically converted to electrical signals. Various kinds of signal processings are then performed on the electrical signals such that image data, e.g. of each of YCrCb, is obtained from the electrical signals. The image data can then be compressed and written into a memory for storage. The stored image data can then be read out from the memory and reproduced on a display device such as a CRT or the like. The digital camera further has a function of displaying a plurality of thumbnail images arranged in a matrix form on the display screen of the display device. The thumbnail images are displayed using a frame memory for temporarily storing therein image data read out from the memory, and a memory controller for managing a corresponding relation between a coordinate position on the display screen and an address of the frame memory.

In the above-described background digital camera, when thumbnail images stored in the image memory are sequentially split into a plurality of groups of thumbnail images such that each of the plurality of groups of thumbnail images can be sequentially displayed on the display screen (an image of a group of thumbnail images to be displayed on the display screen is hereinafter referred to as a "page"), an operator can not determine the page number of a currently displayed page. Further, the number of thumbnail images in one page can be varied, to thereby change the number of pages. However, when the number of thumbnail images to be included in a page is changed while one of the thumbnail images in a page currently being displayed on the display screen is designated with a cursor, the thumbnail image designated with the cursor may not be in a next page displayed on the display screen. An operator may then have difficulty in finding the new page in which the thumbnail image designated with the cursor is located.

SUMMARY OF THE INVENTION

Accordingly, one object of the present invention is to provide a novel digital camera and method by which an operator can easily determine a page number of a currently displayed page, when thumbnail images stored in an image memory are sequentially split into a plurality of pages.

Another object of the present invention is to provide a novel digital camera and method by which a thumbnail image designated with a cursor is in a page displayed in a display screen, even when a number of thumbnail images to be included in a page is reset.

The novel digital camera of the present invention can achieve the above and other objects by including a memory configured to store image data including thumbnail image data and a display configured to display the thumbnail image data. Further, in the novel digital camera of the present invention a controller is configured to control the display of the thumbnail image data and to display page data with the thumbnail image data. As a further feature in the present invention, the page data can include data of a currently displayed page and data of a total number of pages, and further an operator can set and reset the number of thumbnail images which form one page. Further, the operator can change this setting of the number of thumbnail images in one page while selecting a specific thumbnail image of a currently displayed page of thumbnail image data.

As further features in the novel digital camera of the present invention, the controller can calculate the total number of pages in a currently displayed page, and can recalculate this data if the number of thumbnail images in a page is reset by an operator. Further, each of the pages can be accessed sequentially and the first and last pages can be viewed as sequential pages. Segment data can also be displayed and can be recalculated if a number of thumbnail images which form one page is reset by an operator.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
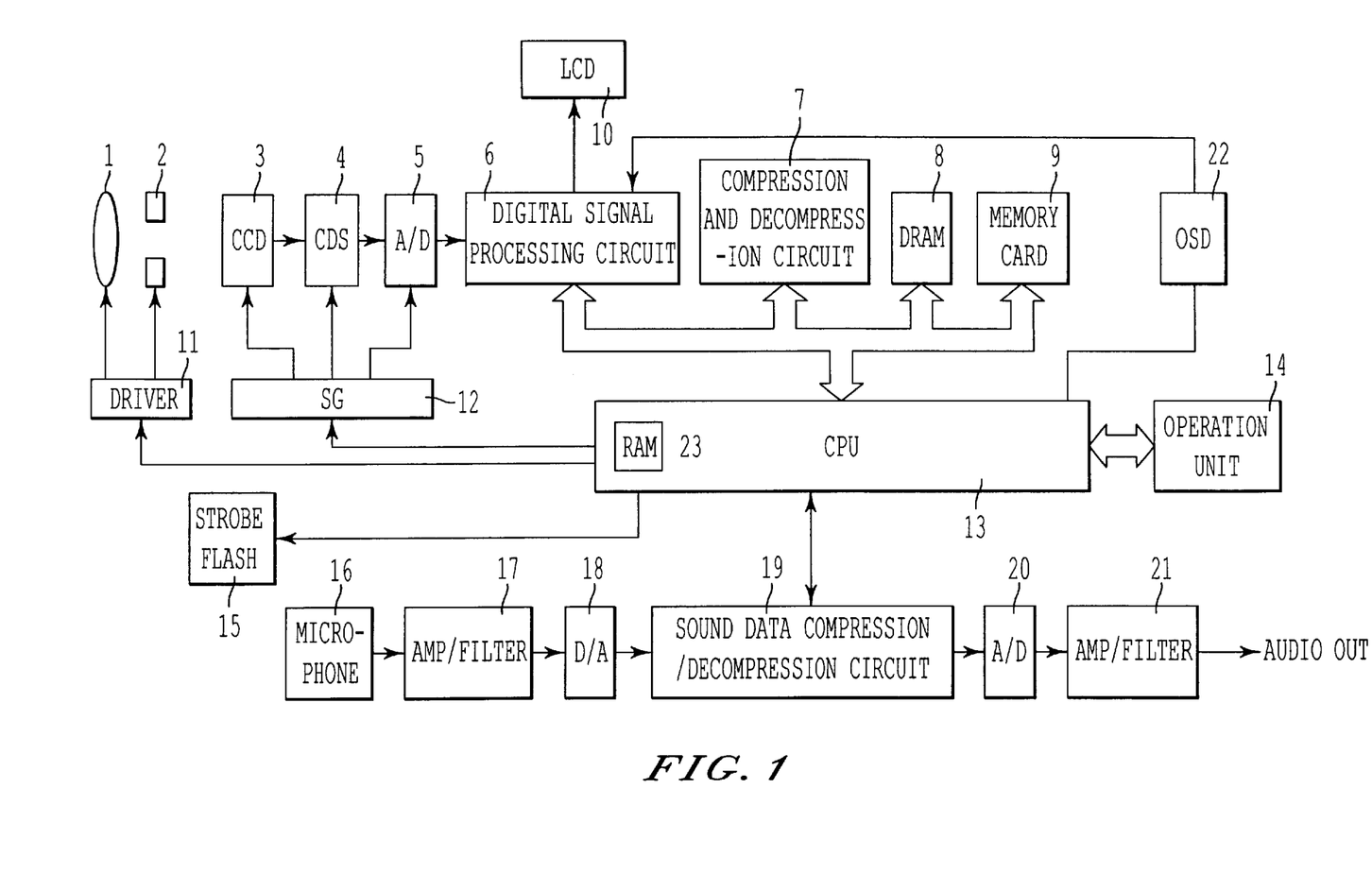
FIG. 1 is a block diagram of an embodiment of a digital camera according to the present invention.

Referring now to the drawings, wherein like reference numerals designate identical or corresponding parts throughout the several views, and more particularly referring to FIG. 1 thereof, a block diagram showing an embodiment of a digital camera according to the present invention is illustrated.

A digital camera illustrated in FIG. 1 includes a lens 1 and a mechanical system 2 including an auto focus, and so forth. The digital camera further includes a charge coupled device (CCD) 3, a correlate dual sampling (CDS) circuit 4, an analog to digital (A/D) converter 5, a digital signal processing circuit 6, a compression and decompression circuit 7, a dynamic random access memory (DRAM) 8, a memory card 9, a liquid crystal display (LCD) 10, a driver 11, a signal generator (SG) 12, a central processing unit (CPU) 13, an operation unit 14, a strobe flash 15, a microphone 16, an amplifier and filter (AMP/FILTER) 17, a digital to analog (D/A) converter 18, a sound data compression and decompression circuit 19, an A/D converter 20, an AMP/FILTER 21, and an on-screen display unit (OSD) 22. The CPU 13 includes a RAM 23 and the CPU 13 is connected to various elements by a CPU BUS 24.

A lens unit of the digital camera includes the lens 1 and the mechanical system 2 including, e.g., an auto focus, an aperture, and a filter unit. A mechanical shutter provided inside the mechanical system 2 simultaneously exposes two field images. The CCD 3 converts optical images, which are input thereto through the lens unit, into electrical signals (analog image data). The CDS circuit 4 reduces noise in the electrical signals output from the CCD 3. The A/D converter 5 converts the analog image data, which are input thereto from the CCD 3 through the CDS circuit 4, into digital image data. In further detail, the A/D converter 5 converts the signals output from the CCD 3 to digital signals through the CDS circuit 4 with a most suitable sampling frequency, for example a multiple number of a sub-carrier frequency of an NTSC signal format.

The digital signal processing circuit 6 separates the image data, which is input thereto from the A/D converter 5, into color-difference data and luminance data, and then performs various processes on the separated data including processes for correcting and compression/decompression. The compression/decompression circuit 7 compresses the image data with, e.g., an orthogonal transformation and a Huffman encoding, and then decompresses the image data, e.g., with a corresponding Huffman decoding and an inverse orthogonal transformation, e.g., in conformity with the Joint Photographic Expert Group (JPEG) standard.

Sound is converted to electrical signals by a sound to electrical signal conversion device such as the microphone 16. In the AMP/FILTER 17 the sound signals are then amplified, and then the sound signals in a predetermined band are passed through the AMP/FILTER 17. The D/A converter 18 then converts the sound signals which have passed through the AMP/FILTER 17 to digital sound data with a sampling frequency which is more than double the frequency of the predetermined band. Then, the sound data compression/decompression circuit 19 compresses and encodes the digital sound data.

The DRAM 8 temporarily stores compressed image data therein. The compressed image data and sound data are recorded in the memory card 9 as an image data file and a sound data file, respectively. The LCD 10 displays an image corresponding to image data stored in the memory card 9. The LCD 10 also displays messages indicating conditions of the digital camera, such as a message indicating an operation mode which is active or a message indicating that an error has occurred.

The operation unit 14 is provided with operation keys for, as examples, selecting desired functions, inputting a photographing instruction, and setting various conditions of the digital camera. The operation keys include, for example, a "thumbnail images display instruction" key for instructing the display of a plurality of thumbnail images on a display screen of the LCD 10 arranged in a matrix form by splitting the thumbnail images stored in the memory card 9 into a plurality of sequential pages. The operation keys of operation unit 14 may further include a "displaying number setting" key for setting a number for specifying the number of thumbnail images to be displayed in a page, a cursor key for identifying one of the thumbnail images currently being displayed in a page with a cursor (identification display), a "page number designation" key for designating a desired page number to be displayed, "page forwarding" and "page moving back" keys for moving forward or back between displayed pages, and a "page number display ON/OFF" key for selecting a display or a non-display of a currently displayed page number P and of a total page number L.

The CPU 13 controls operations of each unit of the digital camera in response to instructions from the operation unit 14 or a remote control unit (not shown), and in accordance with programs stored in a read-only memory (ROM) (not shown). More specifically, the CPU 13 controls, for example, operations of recording image data, thumbnail images, and sound data into the memory card 9, and operations of playing back the image data, thumbnail images, and sound data recorded in the memory card 9 to be displayed on LCD display 10.

Figure 2:
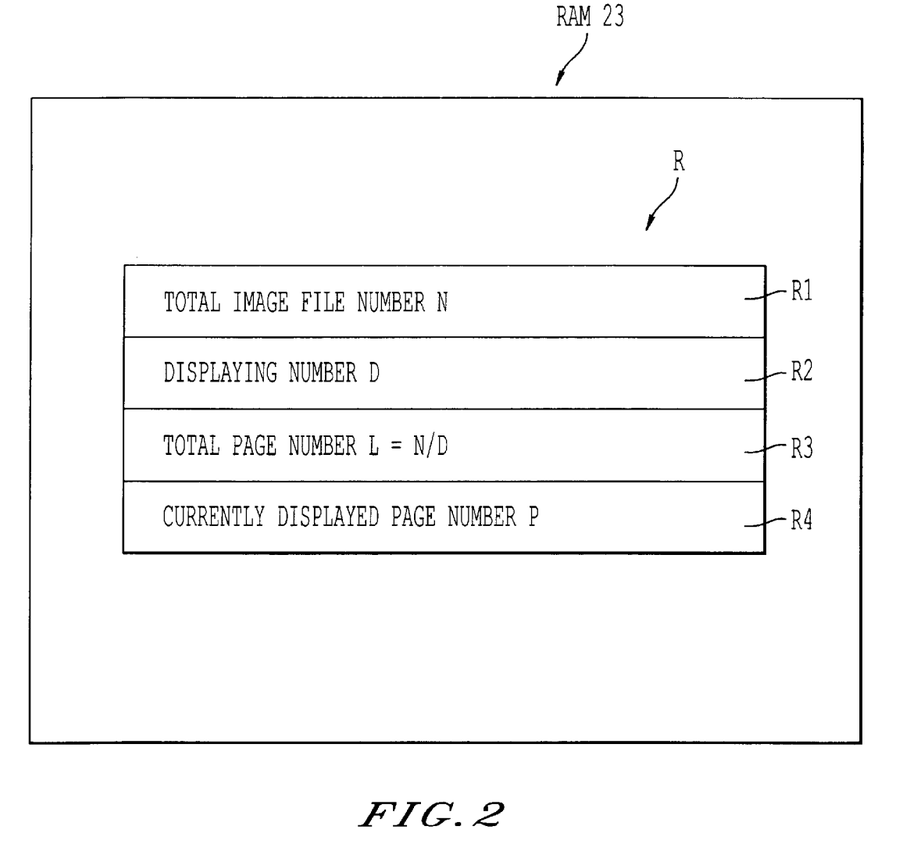
FIG. 2 is a diagram illustrating a structural example of a register used in the digital camera of FIG. 1.

Further, the CPU 13 includes the random access memory (RAM) 23 which includes a register which is used for displaying a plurality of thumbnail images on the LCD display 10. FIG. 2 is a structural example of the register of RAM 23. The register includes, as illustrated in FIG. 2, at least four registers (R1)–(R4) including (R1) a total image file number register R1 for storing a total number N of image data files stored in the memory card 9, (R2) a displaying number register R2 for storing a number D specifying the number of thumbnail images to be displayed in a page as instructed from the "displaying number setting" key provided with the operation unit 14 or as instructed from a default setting operation, (R3) a total page number register R3 for storing a total page number L calculated by dividing the total number N by the number D, and (R4) a currently displayed page number register R4 for storing a page number P specifying the page number of the currently displayed page, which can be set by the "page number designation key" or by a default setting operation. Moreover, the total number N of the image data files is retrieved from a file name data in a directory entry area 94 (described below) of the memory card 9.

Figure 3:
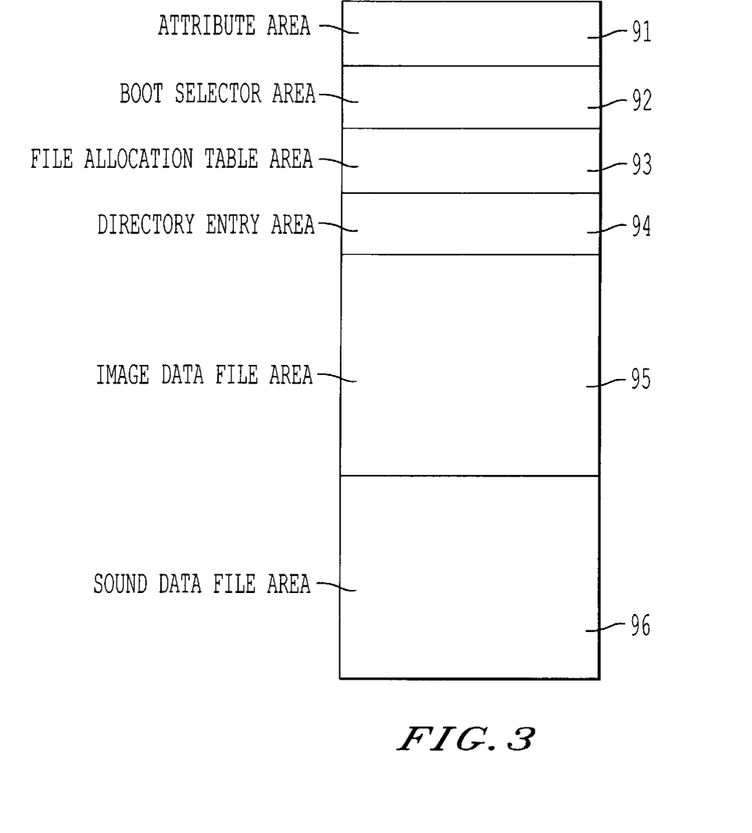
FIG. 3 is a diagram illustrating an example format structure of a memory card used in the digital camera of FIG. 1.

FIG. 3 is a diagram illustrating an example of the data format structure of the above-described memory card 9. This format can be the same as a DOS format for a personal computer.

The memory card 9 includes, as illustrated in FIG. 3, a data structure including: an attribute area 91 for storing attribute information of the memory card 9, such as information of a device type, an access speed, and a storage capacity of the memory card 9; a boot selector area 92; a file allocation table (FAT) area 93; a directory entry area 94; an image data file area 95 for storing image data files, and; a sound data file area 96 for storing sound data files.

In the boot selector area 92, parameters used for writing/reading data to/from the memory card 9, for example, a file allocation table (FAT) and a directory entry, are recorded. In the FAT area 93, a FAT entry of each FAT including file data is recorded. The address of each recorded data in the memory card 9 is indicated by a cluster number that is an allocated number of the recorded data in clusters.

Figure 4:
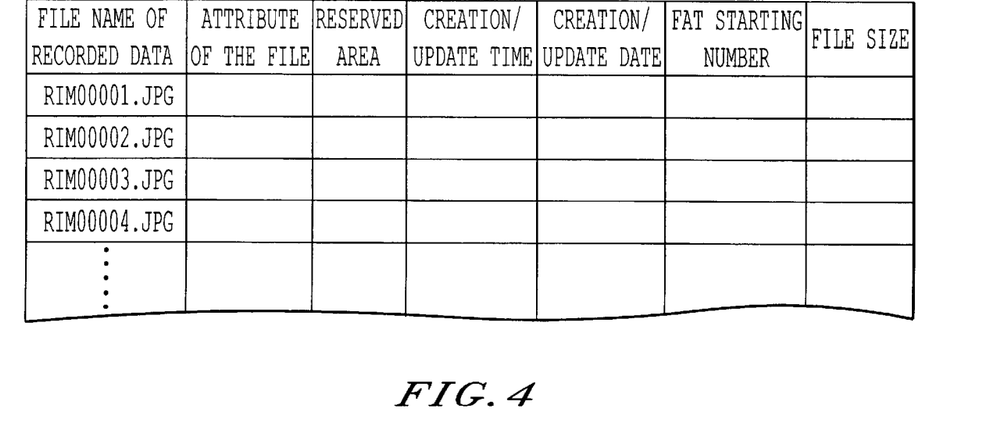
FIG. 4 is a diagram illustrating an example data structure stored in a directory entry area of the memory card used in the digital camera of FIG. 1.

FIG. 4 is an example of the data structure of the directory entry area 94. As illustrated in FIG. 4, the directory entry area 94 records each of information of a file name of recorded data, an attribute of the file, a reserved area, a creation/update time, a creation/update date, a physical address of a corresponding file or sub-directory entry (FAT starting number), and a file size. When a corresponding file is a data file, a file name with extensions is recorded as one of the attribute information of the file.

Figure 5:
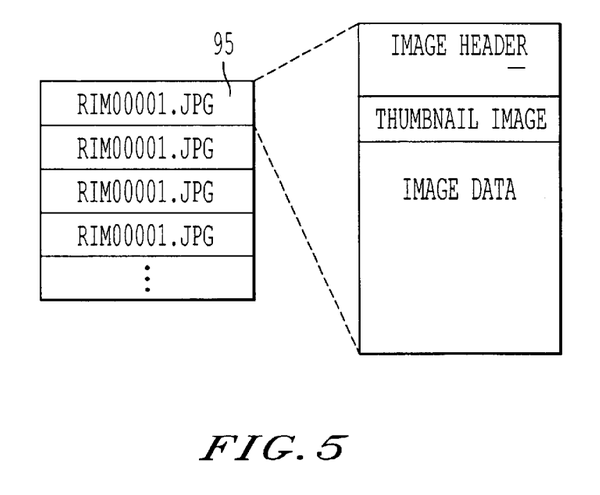
FIG. 5 is a diagram illustrating an example structure of an image data file area of the memory card used in the digital camera of FIG. 1.

FIG. 5 is an example of the data structure of the image data file area 95 in which respective image data files (for example, R1M00001.JPG, R1M00002.JPG, R1M00003.JPG, etc.) are sequentially recorded as data having a fixed data length. An image data file includes an image header, image data, and a thumbnail image corresponding to the image data, as illustrated in FIG. 5. In the image header the following information can be recorded; an attribute of the file; the name of a standard of the file; a version of the standard; related information of the image data, the thumbnail image, and a record mode.

Next, an image data recording operation of the digital camera is now described. After an object image is converted to electrical signals (analog image data) by the CCD 3, the A/D converter 5 converts the analog image data, which is input thereto through the CDS circuit 4, into digital image data. The converted digital image data is processed by the digital signal processing circuit 6 and is then stored in the DRAM 8 through CPU bus 24. Then, the stored digital image data in the DRAM 8 is input to the compression/decompression circuit 7 through the CPU bus 24 to be compressed, and is then re-stored as compressed data in the DRAM 8. After the compression, the CPU 13 records through the CPU bus 24 (see FIG. 5) the compressed image data stored in the DRAM 8 in the memory card 9 as an image data file in a predetermined format. When recording the compressed image data in the memory card 9, a thumbnail image of the image data is created by, e.g., subtracting a part of image pixels of the compressed image data at a predetermined interval, and the created thumbnail image data is recorded in the same image data file of the compressed image data (see FIG. 5).

Next, a playing back operation for displaying an image from the stored image data in the digital camera is now described. When a desired image data file in the memory card 9 is designated by a user to be played back for displaying an image of the data through the operation unit 14, the compressed image data of the designated image data file is read out from the memory card 9 and is then stored in the DRAM 8. Then, the stored image data in the DRAM 8 is input to the compression/decompression circuit 7 through the CPU bus 24 and is decompressed therein, and the decompressed data is then re-stored in the DRAM 8. The decompressed image data stored in the DRAM 8 is input to the digital signal processing circuit 6 through the CPU bus 24 and is converted to video signals to be displayed on the LCD 10.

Next, two exemplary operations (first and second operations) for displaying a plurality of thumbnail images on the screen of the LCD 10 of the digital camera so as to be arranged in a matrix form are now described.

Figure 6A:
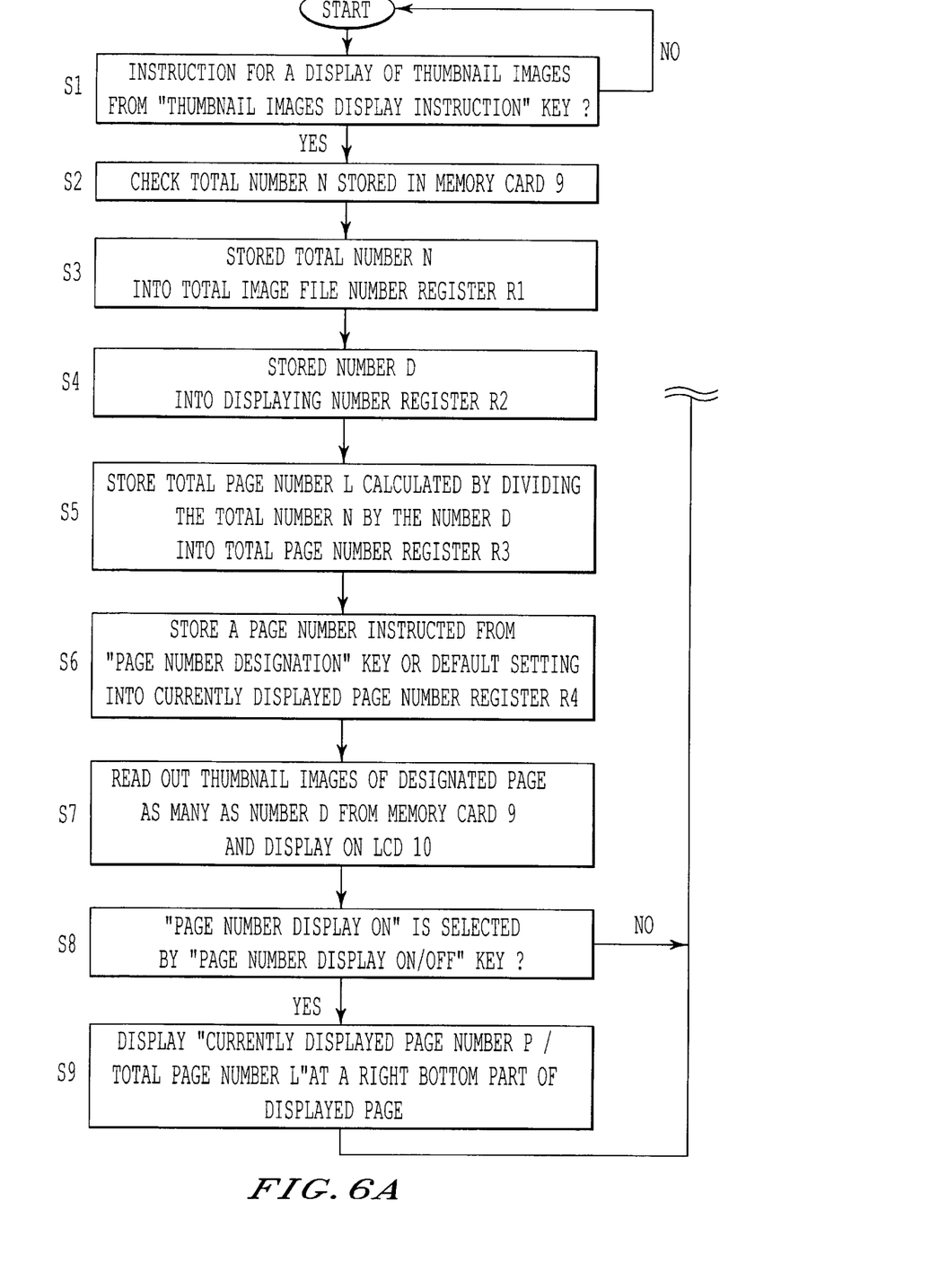
FIG. 6 is a flowchart explaining a first operation executed in the digital camera of FIG. 1.
Figure 6B:
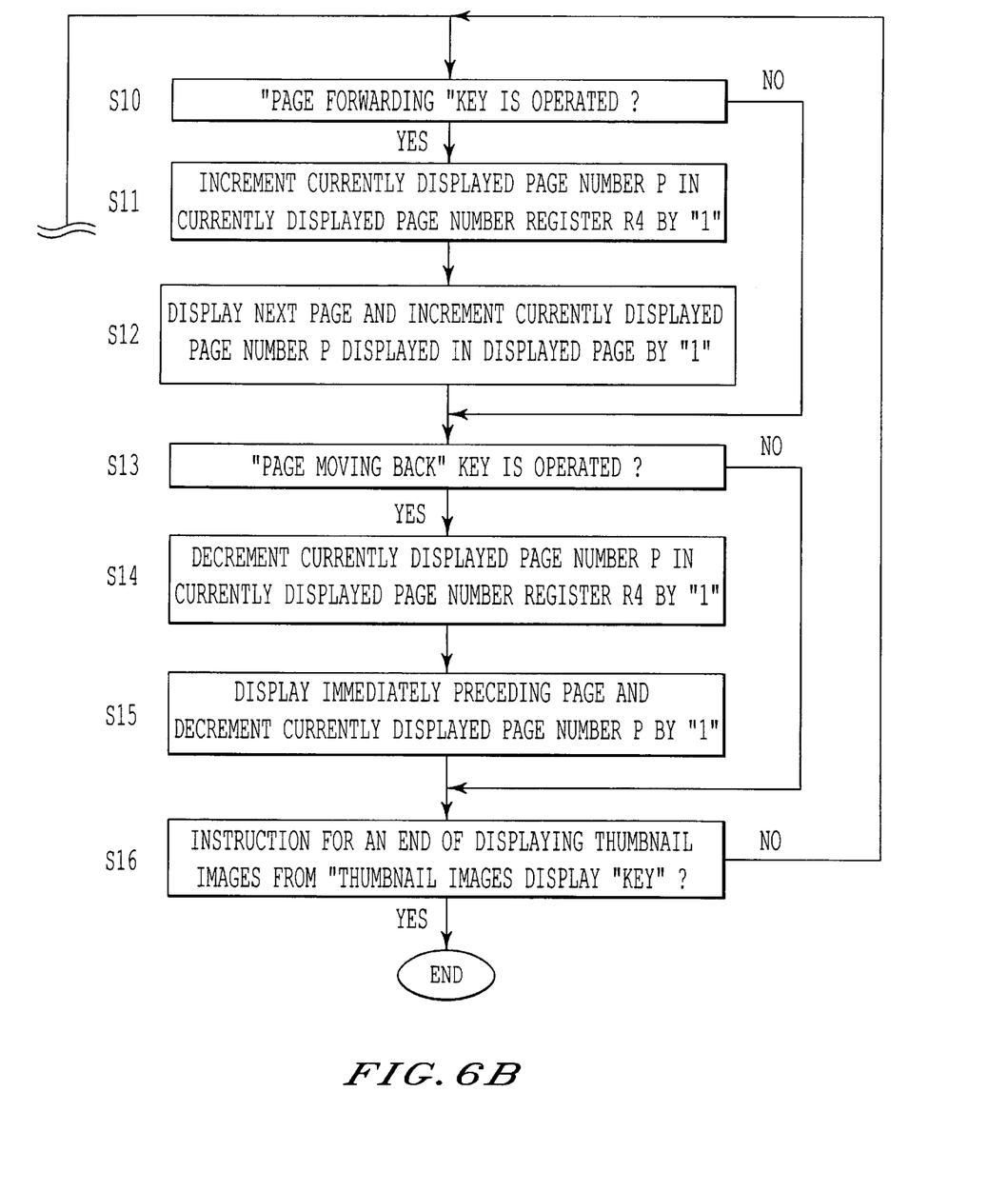

FIG. 6 is a flowchart illustrating the first display operation and FIG. 7 is a diagram illustrating an example of displayed pages of thumbnail images based on execution of this first display operation.

When a display of thumbnail images is instructed from the "thumbnail images display instruction" key of the operation unit 14 in step S1, the CPU 13 checks a total number N of image data files (each image data file including image data and a corresponding thumbnail image) stored in the memory card 9 in step S2. Specifically, the CPU 13 determines the total number N by retrieving the file name data stored in the directory entry area 94 of the memory card 9 (see FIG. 4). A NO in step S1 reverts the operation to "start".

The CPU 13 stores the total number N of image data files into the total image file number register R1 in step S3. Then, the CPU 13 stores a number D specifying the number of thumbnail images to be displayed in a page, which number D can be instructed from the "displaying number setting" key of the operation unit 14 or which can be set in a default setting operation, into the displaying number register R2 in step S4. Then, the CPU 13 stores the total page number L, which is calculated by dividing the total number N by the number D, into the total page number register R3 in step S5. In the above-described calculation, when there is a remainder, the total page number L is the number generated by adding 1 to the quotient after the above calculation. For example, when a total number N of image data files is 50 and a number D for specifying the number of thumbnail images to be displayed in a page is 4, a total page number L is 13 (the quotient of 12 plus 1 for the remainder).

The CPU 13 then stores the page number of the currently displayed page, which can be instructed from the "page number designation" key of the operation unit 14 or which can be set by a default setting operation, into the currently displayed page number register R4 in step S6. The same calculation as noted above is performed to determine on what page an image to be displayed exists (to determine data stored in R4). For example, in the above example, if it is selected to display the 30th image, it is determined that this image is on the 8th page ($30/4$ equals the quotient 7 plus a remainder (+1), and thus the 30th image is determined to be on the 8th page). Then, in step S7 the CPU 13 reads out from the memory card 9 the thumbnail images of the designated page up to the designated number D, and displays the read out thumbnail images on the LCD 10 through the digital signal processing circuit 6. When "page number display ON" is selected by the "page number display ON/OFF" key of the operation unit 14 in step S8, i.e. YES in step S8, the CPU 13 displays "the currently displayed page number P/the total page number L" at a right bottom part of a displayed page in step S9. In order to adjust the size of a thumbnail image to be displayed in a display screen in accordance with the number D, the CPU 13, e.g., subtracts a part of image pixels of each thumbnail image stored in the memory card 9 at a predetermined interval. If the "page number display ON" key is not selected, i.e. NO is step S8, the operation skips step S9 and proceeds to step S10.

When the "page forwarding" key of the operation unit 14 is operated in step 10, i.e. YES in step S10, the CPU 13 increments the currently displayed page number P in the currently displayed page number register R4 by "1" in step S11, and then displays the thumbnail images of the next page in step S12. The CPU 13 further increments the currently displayed page number P displayed in the currently displayed page by "1" in step S12. If the "page forwarding" key is not operated in step S10, i.e. NO in step S10, the operation skips steps S11 and S12 and proceeds to step S13.

When the "page moving back" key of the operation unit 14 is operated in step S13, i.e. YES in step S13, the CPU 13 decrements the currently displayed page number P in the currently displayed page number register R4 by "1" in step S14, and then displays the thumbnail images of the immediately preceding page in step S15. The CPU 13 further decrements the currently displayed page number P displayed in the currently display page by "1" instep S15. If the "page moving back" key is not operated instep S13, i.e. NO in step S13, the operation skips steps S14 and S15 and proceeds to step S16.

In the above-described page forwarding and moving back operations, when a last page is displayed and a "page forwarding" is instructed by the "page forwarding" key, a first page is set to be displayed. When a first page is displayed and a "page moving back" is instructed by the "page moving back" key, a last page is set to be displayed. That is, the first and last pages are viewed as sequential pages.

When an end of displaying thumbnail images is instructed from the "thumbnail images display instruction" key of the operation unit 14 in step S16, the CPU 13 ends the process of displaying the thumbnail images. When the end of displaying thumbnail images is not instructed, i.e. NO in step S16, the processing operation returns to step S10 after step S16.

Figure 7A:
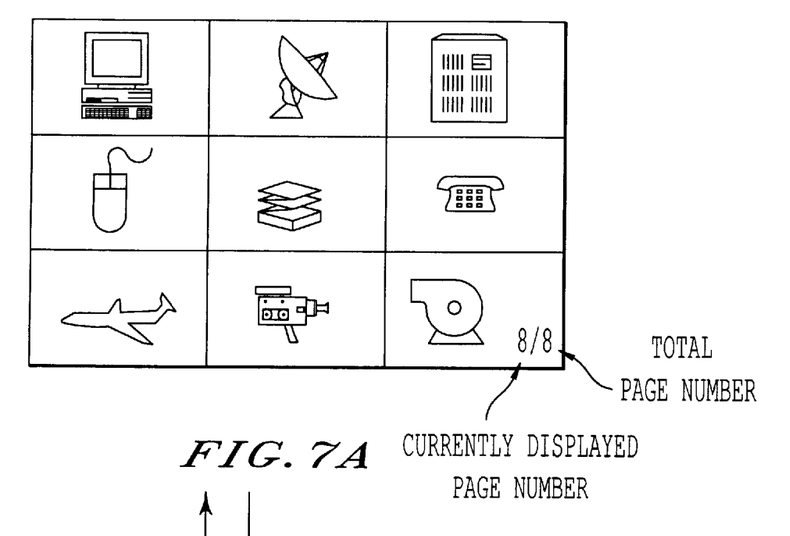
FIG. 7 is a diagram illustrating an example of the first operation executed in the digital camera of FIG. 1.
Figure 7B:
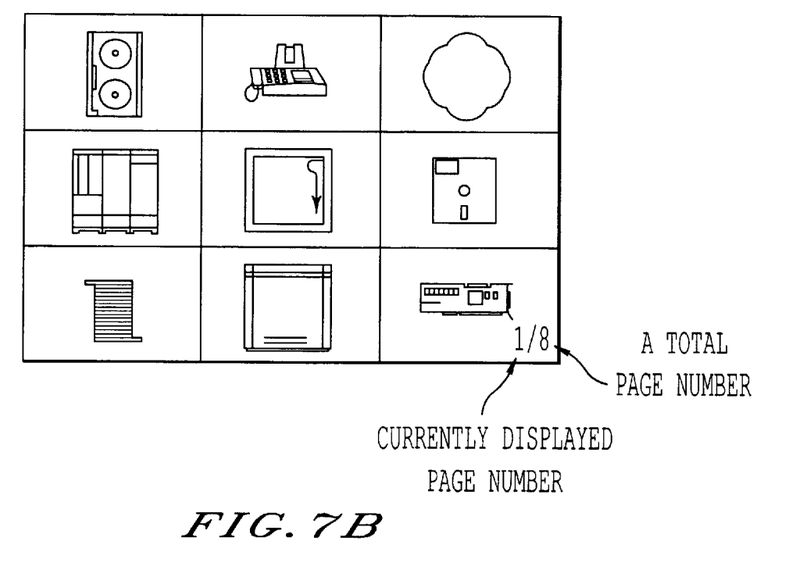

Referring to FIGS. 7(A) and 7(B), the display examples shows the case, as an example, in which the total number N of image data files is 72, the designated number D of thumbnail images in one page is 9, and the total page number L is 8, i.e., L=N/D=72/9=8. In FIGS. 7(A) and 7(B), the 8th page and 1st page are displayed, respectively. When the "page forwarding" key is operated while the 8th page (last page) is displayed as illustrated in FIG. 7(A), the 1st page (start page) is then displayed as illustrated in FIG. 7(B). When the "page moving back" key is operated while the 1st page (start page) is displayed as illustrated in FIG. 7(B), the 8th page (last page) will be then displayed as illustrated in FIG. 7(A).

As shown in FIGS. 7(A) and 7(B), the page data displayed is the currently displayed page number P and the total page number L displayed in the lower right hand corner numerically. That is, the above first operation describes the case in which the currently displayed page number P and the total page number L are the page data displayed by using a numerical figure. However, other displaying methods, such as using an indicator, can be applied. The displayed page data can thus clearly include other data in other forms at other positions. As a specific example, a number of boxes corresponding to the total page number L may be sequentially arranged at a right lower part of a page with a box corresponding to the currently displayed page number P being highlighted.

As described above, according to the example of the first operation, thumbnail images stored in the memory card 9 are split into pages by a number D for specifying the number of thumbnail images to be displayed in one page, which can be instructed by the "displaying number setting" key or which can be set by a default setting operation, and each of the pages is displayed in a display screen. Furthermore, the total page number L (which is calculated by dividing the total number N of image data files recorded in the memory card 9 by the number D which can be designated by the operator for specifying the number of thumbnail images to be displayed in a page or which can be set by a default setting operation) and a currently displayed page number P are displayed in the display screen. Therefore, an operator can easily determine the page number of the currently displayed page and can manipulate displays of thumbnail images smoothly.

Figure 8A:
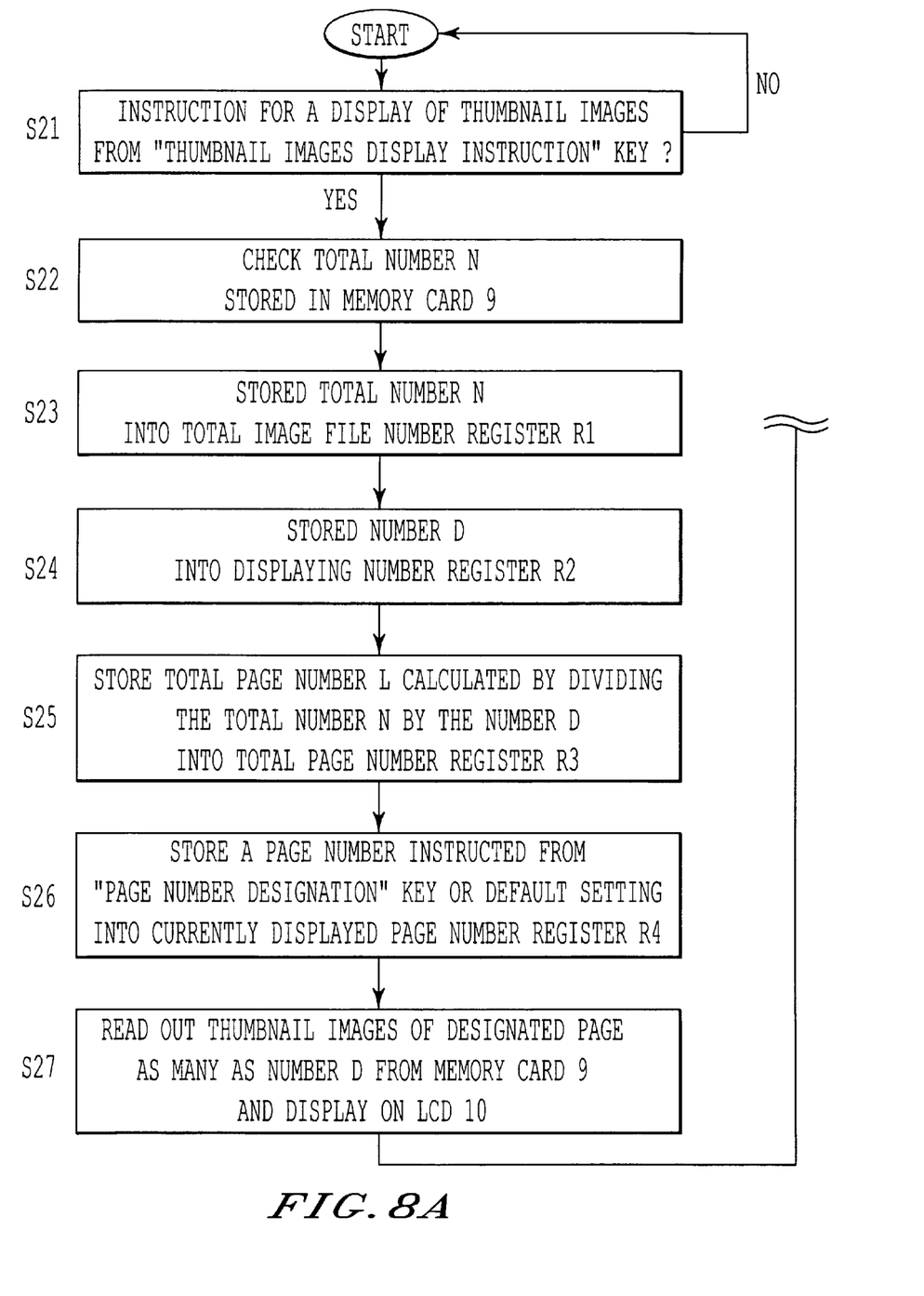
FIG. 8 is a flowchart explaining a second operation executed in the digital camera of FIG. 1.
Figure 8B:
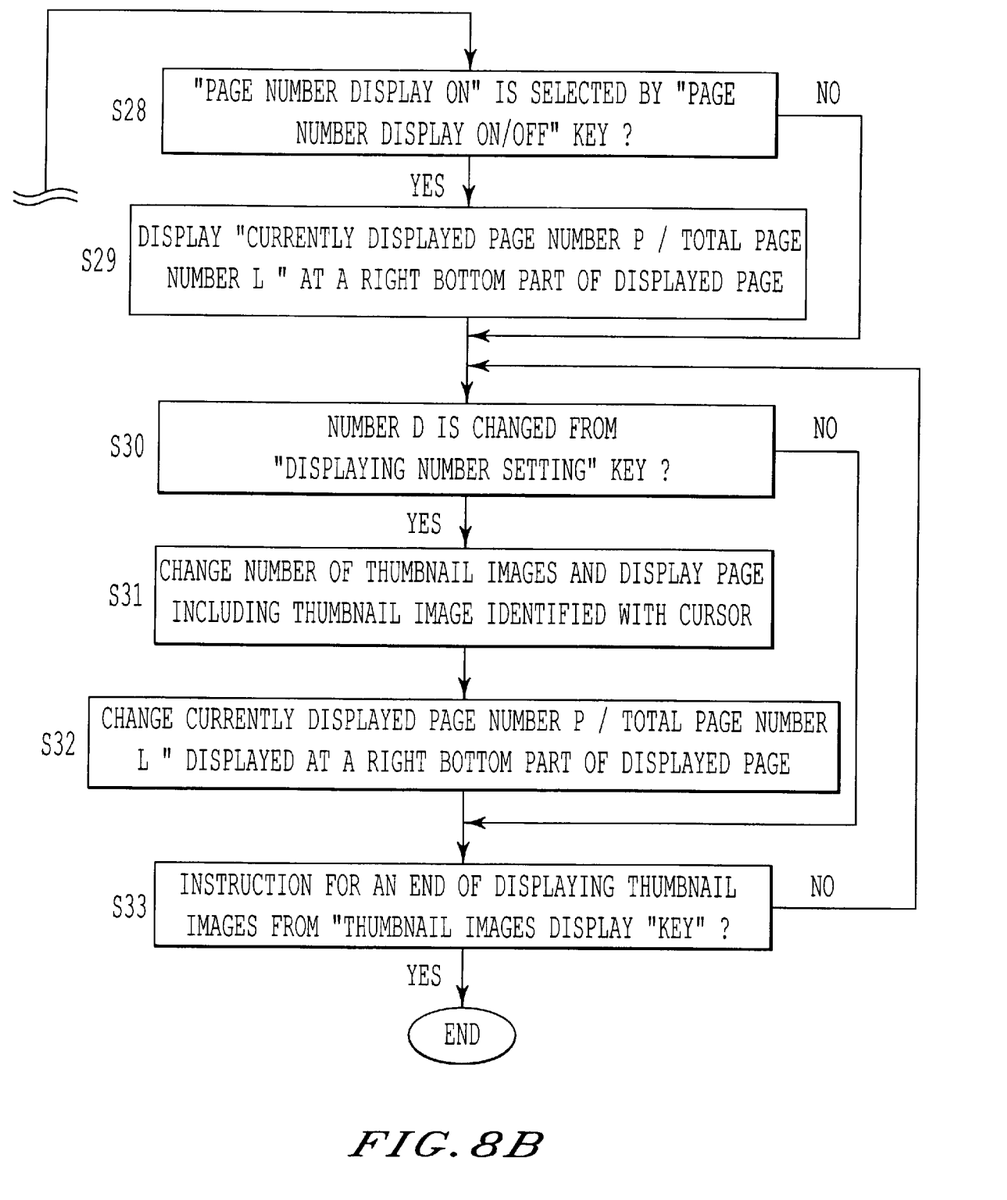

FIG. 8 is a flowchart illustrating the above-noted second display operation and FIG. 9 is a diagram illustrating an example of displayed pages of thumbnail images with this second display operation.

In the second operation, one of the thumbnail images can be identified with a cursor (identifying display) by manipulating the cursor key of the operation unit 14.

As shown in FIG. 8, when a display of thumbnail images is instructed from the "thumbnail images display instruction" key of the operation unit 14 in step S21, i.e. YES in step S21, the CPU 13 checks a total number N of image data files (each image data file including image data and a corresponding thumbnail image) stored in the memory card 9 in step S22. Specifically, the CPU 13 determines the total number N by retrieving the file name data stored in the directory entry area 94 of the memory card 9 (see FIG. 4). A NO in step S21 reverts the operation to "start".

The CPU 13 stores the total number N of image data files into the total image file number register R1 in step S23. Then, the CPU 13 stores a number D specifying the number of thumbnail images to be displayed in a page, which can be instructed from the "displaying number setting" key of the operation unit 14 or which can be set in a default setting operation, into the displaying number register R2 in step S24. Then, the CPU 13 stores the total page number L, which is calculated by dividing the total number N by the number D, into the total page number register R3 in step S25. In the above-described calculation, when there is a remainder, the total page number L is the number generated by adding 1 to the quotient after the above calculation, similarly as in the operation discussed above with respect to the first display operation of FIG. 6.

The CPU 13 then stores the page number, which is instructed from the "page number designation" key of the operation unit 14 or which can be set by a default setting operation, into the currently displayed page number register R4 in step S26. Then, in step S27, the CPU 13 reads out from the memory card 9 the thumbnail images of the designated page, up to the number D, and displays the read out thumbnail images on the LCD 10 through the digital signal processing circuit 6. This operation is also performed similarly as described in the display operation of FIG. 6. When "page number display ON" is selected by the "page number display ON/OFF" key of the operation unit 14 in step S28, i.e. YES in step S28, the CPU 13 displays "the currently displayed page number P/the total page number L" at a right bottom part of a displayed page in step S29. In order to adjust the size of a thumbnail image to be displayed in a display screen in accordance with the number D, the CPU 13, e.g., subtracts a part of image pixels of each thumbnail image stored in the memory card 9 at a predetermined interval. When the "page number display ON" is not selected in step S28, i.e. NO in step S28, the operations skips step S29 and proceeds to step S30. When the number D for specifying the number of thumbnail images to be displayed in a page is changed from the "displaying number setting" key of the operation unit 14 in step S30, i.e. YES in step 530, the CPU 13 changes the number of thumbnail images to be displayed in a page and displays the page including the thumbnail image identified with a cursor, in step S3 1. Then, the CPU 13 changes "the currently displayed page number P/the total page number L" displayed at a right bottom part of the displayed page, in step 532. When the number D is not changed in step S30, i.e. NO in step 530, the operation skips steps S31 and S32 and proceeds to step S33.

When an end of displaying thumbnail images is instructed from the "thumbnail images display instruction" key of the operation unit 14 in step S33, i.e. YES in step S33, the CPU 13 ends the process of displaying thumbnail images. When an end of displaying thumbnail images is not instructed in step S33, i.e. NO in step S33, the operation returns to step S30.

Figure 9A:
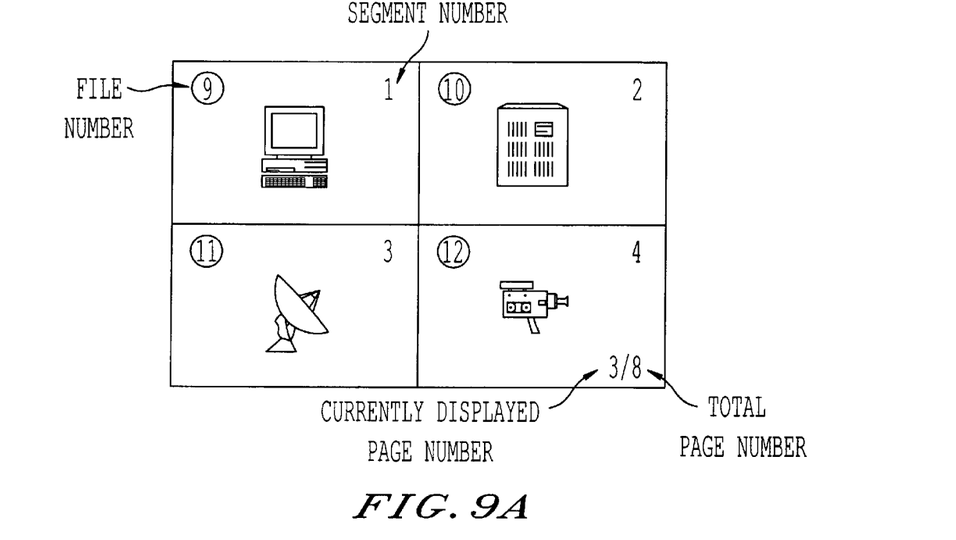
FIG. 9 is a diagram illustrating an example of the second operation executed in the digital camera of FIG. 1.
Figure 9B:
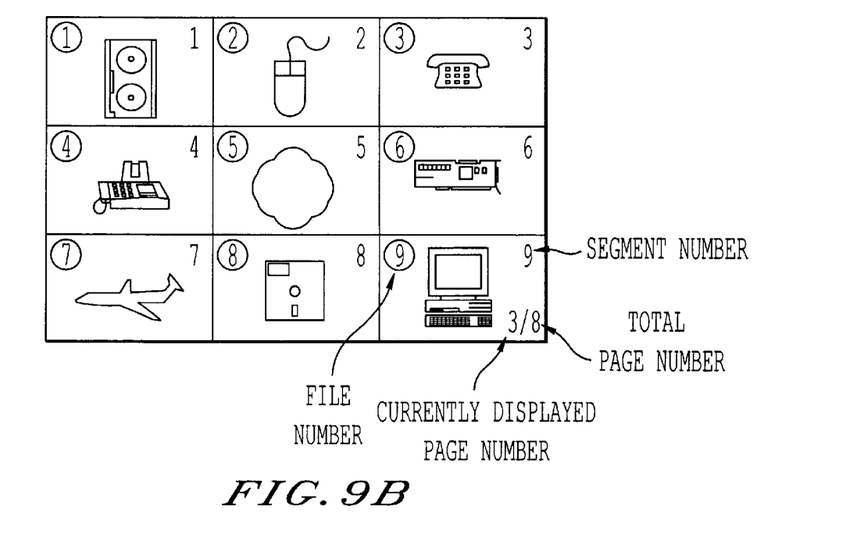

FIG. 9 illustrates a display example when the number D for specifying the number of thumbnail images to be displayed, which can be instructed from the "displaying number setting" key, is changed from four to nine and vice versa when one thumbnail image is designated by a cursor. FIG. 9(A) is a diagram illustrating a displayed page including 4 thumbnail images (a currently displayed page number is 3 and a total page number is 8) with a top left thumbnail image (an image of a personal computer) identified with a cursor. When the number D of thumbnail images to be displayed in a page is changed to 9, a page including nine thumbnail images, and the page including the designated thumbnail image (the image of the personal computer) identified with the cursor, is displayed as illustrated in FIG. 9(B). In this case, the designated thumbnail image (the image of the personal computer) identified with the cursor is positioned at a right bottom segment of the page (a segment number is 9), and a changed display page number 1 and a total page number 4 are displayed at the right bottom part of the new page.

In this embodiment, the file numbers and/or the segment numbers can also be displayed. In the above-described second operation, the CPU 13 first retrieves the file number C of the designated thumbnail image identified with the cursor (the image of the personal computer with file number 9) from the file name data in the directory entry area 94 of the memory card 9 (see FIG. 4). A file number for each image data file is sequentially given to each file in order of storing the image data in the memory card 9. Then, the CPU 13 performs the calculation to determine a new currently displayed page number and segment number by dividing "C−1" with the new number D of thumbnail images to be displayed on one page. As a result, a value of "quotient +1" is obtained as a new currently displayed page number and a value of "remainder +1" is obtained as a new segment number of the thumbnail image identified with a cursor (the image of the personal computer) in a new displayed page.

To further clarify this calculation operation of the present invention, the example noted in FIGS. 9(A) and 9(B) will now be explained in further detail. When resetting the number of thumbnail images in a page from 4 to 9, i.e. when resetting from the display in FIG. 9(A) to the display in FIG. 9(B), first the file number of the selected thumbnail image (e.g., the image of the personal computer with the file number 9) has one subtracted therefrom. That is, in this example the selected personal computer image has file number 9 and one is subtracted therefrom (9−1)=8. Then, this value (8) is divided by the reset number of thumbnail images in a page, i.e., 9, and a quotient are remainder of this division are noted. Thus, by this calculation (9−1)/9 equals a quotient of 0 and a remainder of 8. To determine the new segment number for the selected thumbnail image (the image of the personal computer), the remainder has one added thereto, i.e. (8+1)=9. To determine the new number of the currently displayed page, one is added to the quotient, i.e. (0+1)=1. Thus, in this operation which proceeds from FIG. 9(A) to FIG. 9(B), the designated thumbnail image of the personal computer has a new segment number of 9 and a new currently displayed page number of 1. The total number of pages is 4 and is calculated as described above earlier.

Applying the above-described calculation to a reverse embodiment is described below. When a page including nine thumbnail images, with the thumbnail image of the personal computer (the file number 9) identified with a cursor as illustrated in FIG. 9(B), is changed to a page of four thumbnail images, as shown in FIG. 9(A), a changed display page number and the segment number of the thumbnail image identified with the cursor (the image of the personal computer) in the display page are similarly obtained by the following calculations:

[9−1]÷4=2 (quotient) . . . 0 (remainder)

Accordingly, [2+1]=3 (quotient +1) is set as the new currently displayed page number of the thumbnail image identified with the cursor in the new display page, and [0+1]=1 (remainder +1) is set as the new segment number of the thumbnail image identified with the cursor in the new display page. Thus, the thumbnail image of the personal computer identified with the cursor is positioned at the left top segment (segment number 1), and the changed display page number 3 and the total page number 8 are displayed at the right bottom part of the new display page.

As described above, according to the example of the second operation, when thumbnail images stored in the memory card 9 are split into a plurality of pages and a number for specifying the number of thumbnail images is changed, a control is executed such that a page including a thumbnail image identified with a cursor is displayed in a next new display page. Therefore, an operator can easily find the thumbnail image identified with a cursor in a previously displayed page in the new display page.

In changing a number for specifying the number of thumbnail images to be displayed in a page, any number can be selected on condition that the length-to-width ratio of a thumbnail image is kept substantially the same. However, for better viewability, a maximum of sixteen thumbnail images are preferable in a page.

Obviously, numerous additional modifications and variations of the present invention are possible in light of the above teachings. It is therefore to be understood that within the scope of the appended claims, the present invention may be practiced otherwise than as specifically described herein.

This application is based on Japanese Patent Application No. 09-354801 filed in the Japanese Patent Office on Dec. 24, 1997, the entire contents of which are hereby incorporated by reference.

What is claimed is:

1. A digital camera, comprising:

a memory configured to store image data including thumbnail image data;

a display configured to display the thumbnail image data;

a controller configured to control display of the thumbnail image data in pages and configured to display page data with the thumbnail image data; and an input configured to receive an input to set a number of thumbnail image data to be displayed in one page, wherein the input is further configured to receive a reset input to reset the number of thumbnail image data to be displayed in one page when one thumbnail image data of a displayed page is selected, and such that the selected thumbnail image data is displayed on a reset page, and wherein the display is further configured to display for each thumbnail image both a file number and a segment number, the file number representing an order in which each respective thumbnail image data is stored in the memory and the segment number representing an order of displaying each respective thumbnail image in one page, and the controller is further configured to recalculate the segment number based on the reset input to reset the number of thumbnail image data in one page.

2. A digital camera according to claim 1, wherein the page data includes data of a currently displayed page and data of a total number of pages of thumbnail image data.

3. A digital camera according to claim 1, further comprising a selector configured to consecutively display sequential pages of the thumbnail image data.

4. A digital camera according to claim 1, wherein the controller is further configured to calculate at least one of a total number of pages of thumbnail image data and a currently displayed page number from the input to set the number of thumbnail image data in one page.

5. A digital camera according to claim 3, wherein a last page and a first page are sequential pages.

6. A digital camera according to claim 1, wherein the controller is further configured to calculate at least one of a currently displayed page number and a total number of pages of thumbnail image data based on the reset input to reset the number of thumbnail image data in one page.

7. A digital camera, comprising:

memory means for storing image data including thumbnail image data;

display means for displaying the thumbnail image data;

control means for controlling display of the thumbnail image data in pages and controlling display of page data with the thumbnail image data; and input means for receiving an input for setting a number of thumbnail image data in one page, wherein the input means can further receive a reset input for resetting the number of thumbnail image data in one page when one thumbnail image data of a displayed page is selected, and such that the selected thumbnail image data is displayed on a reset page, and wherein the display means further displays for each thumbnail image both a file number and a segment number, the file number representing an order in which each respective thumbnail image data is stored in the memory and the segment number representing an order of displaying each respective thumbnail image in one page, and the control means further recalculates the segment number based on the reset input for resetting the number of thumbnail image data in one page.

8. A digital camera according to claim 7, wherein the page data includes data of a currently displayed page and data of a total number of pages of thumbnail image data.

9. A digital camera according to claim 7, further comprising selector means for selecting to consecutively display sequential pages of the thumbnail image data.

10. A digital camera according to claim 7, wherein the control means further calculates at least one of a total number of pages of thumbnail image data and a currently displayed page number from the input for setting the number of thumbnail image data in one page.

11. A digital camera according to claim 9, wherein a last page and a first page are sequential pages.

12. A digital camera according to claim 7, wherein the control means further calculates at least one of a currently displayed page number and a total number of pages of thumbnail image data based on the reset input for resetting the number of thumbnail image data in one page.

13. A control method for a digital camera, comprising the steps of:

storing image data including thumbnail image data;

displaying the thumbnail image data;

controlling display of the thumbnail image data in pages and display of page data with the thumbnail image data; and a step of inputting a setting for a number of thumbnail image data in one page, wherein the step of inputting can further reset the number of thumbnail image data in one page when one thumbnail image data of a displayed page is selected, and such that the selected thumbnail image data is displayed on a reset page;

wherein the display step further displays for each thumbnail image both a file number and a segment number, the file number representing an order in which each respective thumbnail image data is stored in the memory and the segment number representing an order of displaying each respective thumbnail image in one page, and the controlling step further recalculates the segment number based on the setting input to reset the number of thumbnail image data in one page.

14. A control method for a digital camera according to claim 13, further comprising a step of selecting to consecutively display sequential pages of the thumbnail image data.

15. A control method for a digital camera according to claim 13, further comprising a step of displaying a file number for each thumbnail image data.

16. A control method for a digital camera according to claim 13, wherein the controlling step further calculates at least one of a total number of pages of thumbnail image data and a currently displayed page number from the setting input to set the number of thumbnail image data in one page.

17. A control method for a digital camera according to claim 14, wherein a last page and a first page are sequential pages.

18. A control method for a digital camera according to claim 13, wherein the controlling step further calculates at least one of a currently displayed page number and a total number of pages of thumbnail image data based on the setting input to reset the number of thumbnail image data in one page.

* * * * *